(12) United States Patent
Larsson (10) Patent No.: US 9,080,699 B2
(45) Date of Patent: Jul. 14, 2015

(54) HORIZONTAL CONNECTING DEVICE

(75) Inventor: Johan Larsson, Årjäng (SE)

(73) Assignee: AKER SUBSEA AS, Lysaker (NO)

( * ) Notice: Subject to any disclaimer, the term of this patent is extended or adjusted under 35 U.S.C. 154(b) by 525 days.

(21) Appl. No.: 13/500,654

(22) PCT Filed: Oct. 6, 2010

(86) PCT No.: PCT/NO2010/000355
§ 371 (c)(1),
(2), (4) Date: Apr. 6, 2012

(87) PCT Pub. No.: WO2011/043671
PCT Pub. Date: Apr. 14, 2011

(65) Prior Publication Data
US 2012/0199358 A1    Aug. 9, 2012

(30) Foreign Application Priority Data

Oct. 7, 2009   (NO) .................................. 20093107

(51) Int. Cl.
*E21B 43/013*   (2006.01)
*F16L 1/26*   (2006.01)
*E21B 43/01*   (2006.01)

(52) U.S. Cl.
CPC .................. *F16L 1/26* (2013.01); *E21B 43/013* (2013.01); *E21B 43/0107* (2013.01)

(58) Field of Classification Search
CPC ....... E21B 43/013; E21B 43/0107; F16L 1/26
USPC .......... 166/341, 343, 347, 360, 368; 405/158, 405/169
See application file for complete search history.

(56) References Cited

U.S. PATENT DOCUMENTS

| 3,724,061 | A | * | 4/1973 | Schipper | 29/464 |
| 4,102,146 | A | * | 7/1978 | Dietrich | 405/169 |
| 4,191,256 | A | * | 3/1980 | Croy et al. | 166/343 |
| 4,661,017 | A | * | 4/1987 | Wood et al. | 405/169 |
| 4,784,525 | A | * | 11/1988 | Francois | 405/191 |
| 6,997,645 | B2 | * | 2/2006 | von Trepka et al. | 405/170 |
| 7,402,000 | B2 | * | 7/2008 | Bastesen et al. | 405/170 |
| 7,467,662 | B2 | * | 12/2008 | Smith | 166/343 |

(Continued)

FOREIGN PATENT DOCUMENTS

| NO | 325935 B1 | 8/2008 |
| WO | WO 2008/063080 A1 | 5/2008 |

*Primary Examiner* — Matthew Buck
(74) *Attorney, Agent, or Firm* — Birch, Stewart, Kolasch & Birch, LLP (57) ABSTRACT

A connecting device for mating and connection on the sea bed of first and second pipelines having first and second pipe ends at the connection point, is shown. The connecting device includes a first connecting part retaining the first end; a second submersible connecting part retaining the second end and a connector arranged between the connecting parts for final connection between the pipe ends. A guiding device engages with a guiding structure during a lowering motion of the second connecting part towards the first connecting part and pivots the second connecting part into coarse alignment of the second pipe end in a direction towards the first pipe end such that the first and second pipelines are brought to align with each other. An adjacent ramp structure with abutment surfaces and a guiding mechanism cooperate with the second connecting part and contribute to fine alignment of the pipe ends.

15 Claims, 5 Drawing Sheets

(56) References Cited

U.S. PATENT DOCUMENTS 8,057,126 B2 * 11/2011 Mogedal et al. .............. 405/170
8,267,179 B2 * 9/2012 Butcher et al. ................ 166/341
2007/0269270 A1 * 11/2007 Bastesen et al. .............. 405/170
2008/0014026 A1 * 1/2008 Routeau et al. ............ 405/224.2
2011/0005764 A1 * 1/2011 Bekkevold .................... 166/344

* cited by examiner

HORIZONTAL CONNECTING DEVICE

The present invention relates to a horizontal connecting device for mating and connection on the sea bed of a first pipeline having respective first and second pipe ends at the connection point, including a first connecting part supporting, or retaining the first end of the first pipeline, which first connecting part and first pipeline are designed to be landed and deployed on the seabed in beforehand, and where the first connecting part includes a guide structure located a distance apart from the pipe end, a second submersible connecting part supporting, or retaining the second end of the second pipeline, which second connecting part and second pipeline are designed to be lowered from the surface towards the first connecting part, and where the second connecting part includes a guide means located a distance apart from the pipe end, and a connector arranged between the connecting parts for final connection between the pipe ends.

In this context "horizontal connecting device" has that meaning that the connecting parts are mated in a substantially horizontal direction.

On subsea structures, for example manifold and valve structures, which are deployed on the seabed, piping is often arranged thereon having one or more pipes that terminate in open pipe subs, or porches, forming a connecting point. Each connecting point includes a stationary connecting part. "Stationary" in this context means relative to the subsea structure. The connecting point is later used for connection to an external pipe.

There exist two principles for the connecting devices, either vertical or horizontal. For a horizontal connecting device the connecting point projects horizontally out from the structure. In the North Sea this solution almost has market control. Other places, like the Gulf of Mexico for example, the vertical solution is the most common one.

One example of a vertical connecting device is shown in NO 2009 2880.

It is to be mentioned that in principle there are three (or actually two) different forms for external connections to a structure:

Direct connection between two structures. Here, a rigid pipe having a mobile connecting part at each end normally will be used. This will usually be termed a jumper. The jumper will be manufactured based on measuring the relative position of the two connecting points.

Connection between the end of a pipeline (rigid pipe) and a structure. It is almost impossible (at least very difficult) to connect a rigid pipe line directly to a structure preinstalled on the seabed. Thus, an intermediate piece of pipe, frequently termed a "spool", is provided between the pipe line and the structure. In order to be able to connect the spool to the pipeline, the pipeline will be welded directly to a small structure including a connecting point. A spool is in principle like the jumper described above.

Direct connection of a flexible pipeline or umbilical to a structure. In some cases it is chosen to use so called flexible pipes in stead of rigid steel pipes. Such pipes can be compared with a big garden hose. Then it is not necessary with a spool or jumper between the end of the pipe and the structure. The pipe is so flexible that one may have a mobile connector part right on the end of the pipe, and connect this one directly to the stationary connector part on the structure. Then it is neither necessary to make precise measurements of the position on the connecting point on the structure.

It is to the latter principle this application is related.

In order to facilitate subsea mating of pipe ends, a completely new connecting device has been developed. As before, this consists of a stationary part resting on a bottom structure, such as a manifold structure, a mobile part to be lowered from the surface and a clamp connector which performs the final connecting operation. The now proposed connecting device takes new regards which previously have not been attended to in a satisfactorily way.

One object with the present invention has been to make it possible to retrieve the entire subsea structure to the surface, and in such a way that appears pretty easy in this connexion. This means that all external pipes and pipelines laying on the seabed and extending toward the subsea structure shall be disconnectable and remain resting on the seabed when the subsea structure is elevated.

Another object with the present invention has been to design the connecting parts with means enabling them to align relative each other in order to bring the pipe ends in line before the connection itself is made up, and at the same time prevent that the mobile connecting part having attached flexible pipe is not allowed to tilt or withdraw.

Another object with the present invention has been to provide such a solution that as little equipment as possible remain on the seabed. With this new solution can guide structures and tools be retrieved to the surface subsequent to that the connecting device is installed. Thus, this provides savings regarding "steel" that are left behind on the seabed and naturally reuse of these tools and components which in turn provides valuable savings.

Still another object with the present invention has been to achieve a minimum of subsea operations and ROV interventions. The ROV disconnects installation tools with two ROV locks. Thus the installation vessel can leave the site and continue with next installation. A different, smaller and more reasonable vessel can then continue with the ROV operations needed to operate the pull/push tool in order to bring the pipe ends against each other before final connection is made up with the connector.

The above describe objects are achieved with a connecting device of the introductory said kind, which according to the present invention is distinguished in that the guiding means engage with the guiding structure during a lowering motion of the second connecting part and pivots the second connecting part into coarse alignment of the second pipe end in a direction towards the first pipe end such that the first and second pipelines are brought to align with each other on the sea bed, and that the first connecting part includes an adjacent ramp structure having abutment surfaces and guiding means designed for engagement with cooperating surfaces and means on the second connecting part when the second connecting part is displaced towards the first connecting part to fine alignment of the pipe ends.

In a preferred embodiment the adjacent ramp structure can be physically separated from the first connecting part. Then the second connecting part can be parked on the ramp structure subsequent to that a disconnecting operation between the connecting parts is performed. The structure that the first connecting part is a part of thus can be retrieved to the surface as required, while the or the other connecting parts remain parked on the seabed.

In a practical embodiment the guiding means of the ramp structure can include a projecting plate part, and the cooperating means of the second connecting part can be an incision, or a notch. The projecting plate part and the notch comes into engagement with each other when the pipe ends approach each other and then prevent possible tilting motion of the second connecting part. In addition it may have buffers or stops that prevent displacement in the longitudinal direction.

Suitably, the abutment surfaces of the ramp structure includes ramp like surfaces that the cooperating surfaces of the second connecting part act against, and then provides fine alignment between the pipe ends when the second connecting part is advanced towards the first connecting part.

In one embodiment the guiding structure can be an upwardly projecting frame structure which is able to receive the corresponding guide means arranged on the second connecting part.

The guide means of the second connecting part can include a projecting bail structure that, in an initial phase, in a sliding manner, cooperates with the upwardly projecting frame structure of the first connecting part. When the bail structure is completely introduced into and bottoms out against a portion of the upwardly projecting frame structure, the second connecting part pivots until abutment with the ramp structure and thus the pipe ends are coarsely aligned relative to each other.

In a practical embodiment, the first connecting part can include at least one guide pin and the second connecting part can correspondingly have at least a cooperating female part which together constitutes additional guiding means.

The connector can constitute an integrated part of the connecting device, where the connector in a variant is secured onto the second connecting part. The second connecting part is displaceable in a direction towards and away from the first connecting part in order to position the pipe ends before final connection of the pipe ends by said connector.

As an alternative, the connector can be secured to the first connecting part and the second connecting part can be displaceable in a direction towards and away from the first connecting part. Again, to position the pipe ends before final connection of the pipe ends by the connector.

In one embodiment the connector may constitute a separate unit that can be landed between the pipe ends subsequent to that the pipe ends are coarsely positioned and aligned relative to each other.

Normally, the connector will be of the type "clamp connector" having internally arranged annular and inclined surfaces which by activation forces two pipe flanges axially towards each other, where one of the flanges has a sealing ring arranged thereon having externally arranged, annular inclined surfaces. As a contemplated alternative, the connector may be of the type "collet connector".

As an accessory, it will be possible to introduce such equipment that at least one of the connecting parts include orienting means that are able to turn the other connecting part in the horizontal plane in order to coarsely align the second connecting part relative to the first connecting part, such that the pipe ends, in this way, are brought to lay substantially in line with each other before further lowering of the second connecting part along said guiding means.

As a variant, the projecting bail structure of the second connecting part can be in the form of a tool which is releasable arranged and can be recovered to the surface after the connection is made up.

In order to pull or push the connecting parts towards or away from each other, a pull/push tool is used, which tool is operated by a ROV. For securing the tool, the first and second connecting part can have at least one adapted mount for insertion of the pull/push tool.

Other and further objects, features and advantages will appear from the following description of preferred embodiments of the invention, which is given for the purpose of description, and given in context with the appended drawings where:

Figure 1:
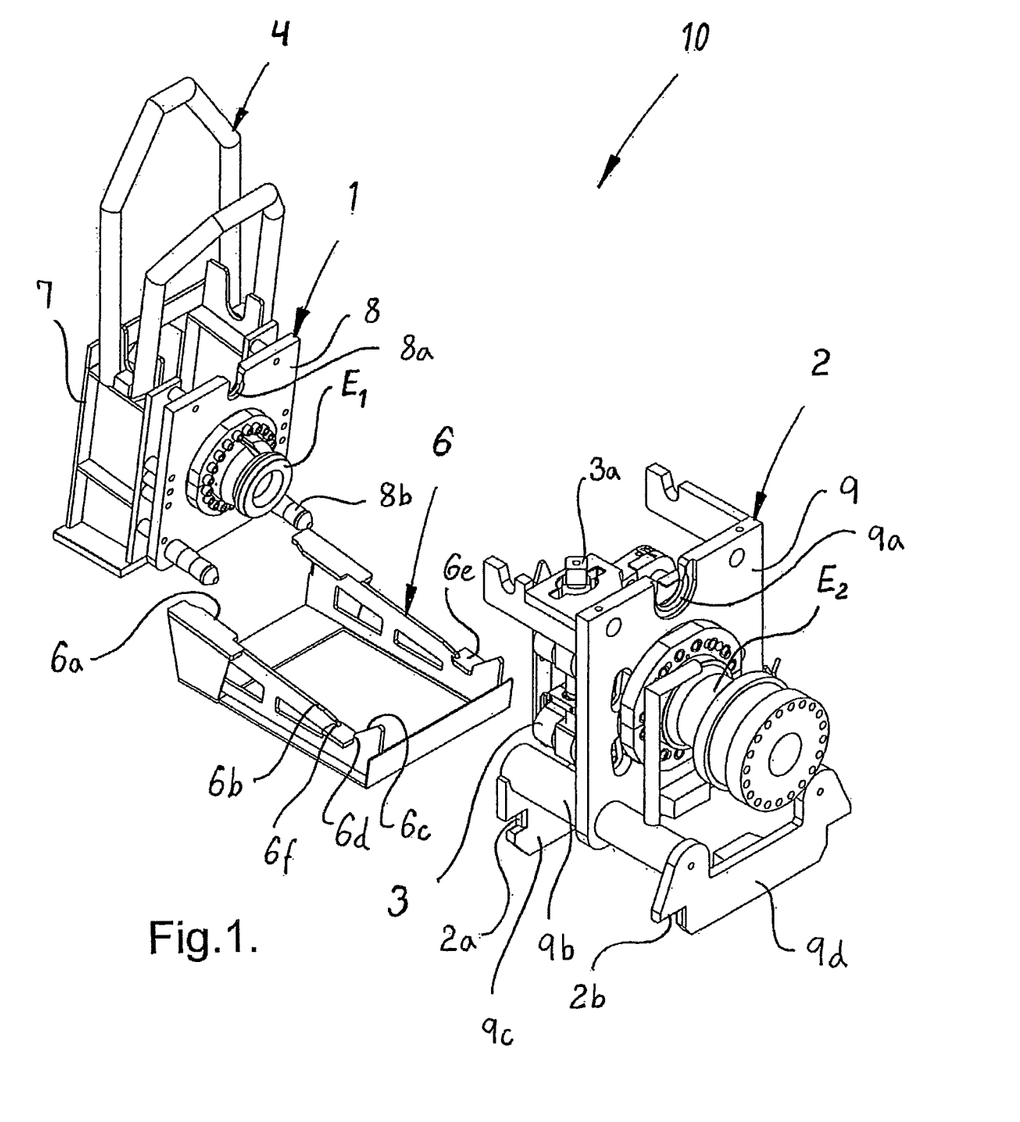
FIG. 1 shows in perspective view, obliquely from above, a horizontal connecting device having the individual connecting parts spaced apart.

Reference is firstly made to FIG. 1 that shows a complete connecting device 10 which is developed to perform mating and connection of pipelines on the seabed. It is assembled by a first connecting part 1, a second connecting part 2 and a ramp structure 6.

The first connecting part 1 is secured to a subsea structure (not shown), such as a manifold structure or a x-mas tree structure. The first connecting part 1 can be considered as stationary relative to the subsea structure. The first connecting part 1 is such arranged that it supports, or retains, the end $E_1$ of a first pipeline, which then will be located within the subsea structure. It is to be understood that the first connecting part 1 and the first pipeline will firstly be landed on the seabed (together with the subsea structure). The first connecting part 1 includes a guide structure 4 located some distance apart from the pipe end $E_1$.

Later on, the second connecting part 2 is to be lowered from the surface in a direction towards the subsea structure, more precisely towards the first connecting part 1. With that, the second connecting part 2 can be considered as mobile relative to the subsea structure. The second connecting part 2 is such arranged that it retains the end $E_2$ of a second pipeline. The second connecting part 2 includes a guiding means 5 located some distance apart from the pipe end $E_2$.

The ramp structure 6 is located close to or adjacent to the first connecting part 1. The ramp structure 6 has a major function when the connecting parts 1, 2 are to be mated, and possibly at later occasions if disconnection is to be made. The ramp structure 6 is equipped with abutment surfaces and guiding means which are designed for engagement with cooperating surfaces and means on the second connecting part 2 when the second connecting part 2 is advanced towards the first connecting part 1. When this is performed fine alignment between the pipe ends $E_1$, $E_2$ is achieved.

A connector 3 is arranged on one of the connecting parts 1, 2, here shown on the second connecting part 2. After that the pipe ends $E_1$, $E_2$ are fine aligned with each other and pulled together until contact flange to flange, possibly with a seal therebetween, the connector 3 is activated and makes final, lasting connection between the pipe ends $E_1$, $E_2$. The connector 3 is operated by a ROV that turns a threaded bolt 3a on the connector 3.

The connector 3 will normally be of that type clamp connector having internally arranged, annular inclined surfaces, which by activation forces two pipe flanges axially towards each other. One of the pipe flanges has a sealing ring installed thereon having externally arranged, annular inclined surfaces. As a contemplated alternative, the connector can be of the type "collet connector".

It is to be emphasized that the ramp structure 6, in a preferred embodiment, is physically separated from the first connecting part 1. Then the second connecting part 2 can at desire, be parked on the ramp structure 6 after that a disconnecting operation between the connecting parts 1, 2 has been made. Then the subsea structure, which the first connecting part 1 is part of can be recovered to the surface. Normally there are many such first and second connecting parts 1, 2 for each subsea structure and, as one will understand, all the second connecting parts 2 will remain parked on the ramp structure 6 on the seabed when the subsea structures need to be recovered to the surface for maintenance, modifications, repair, etc. The described physical separation is, however, not necessarily totally definite.

Figure 2:
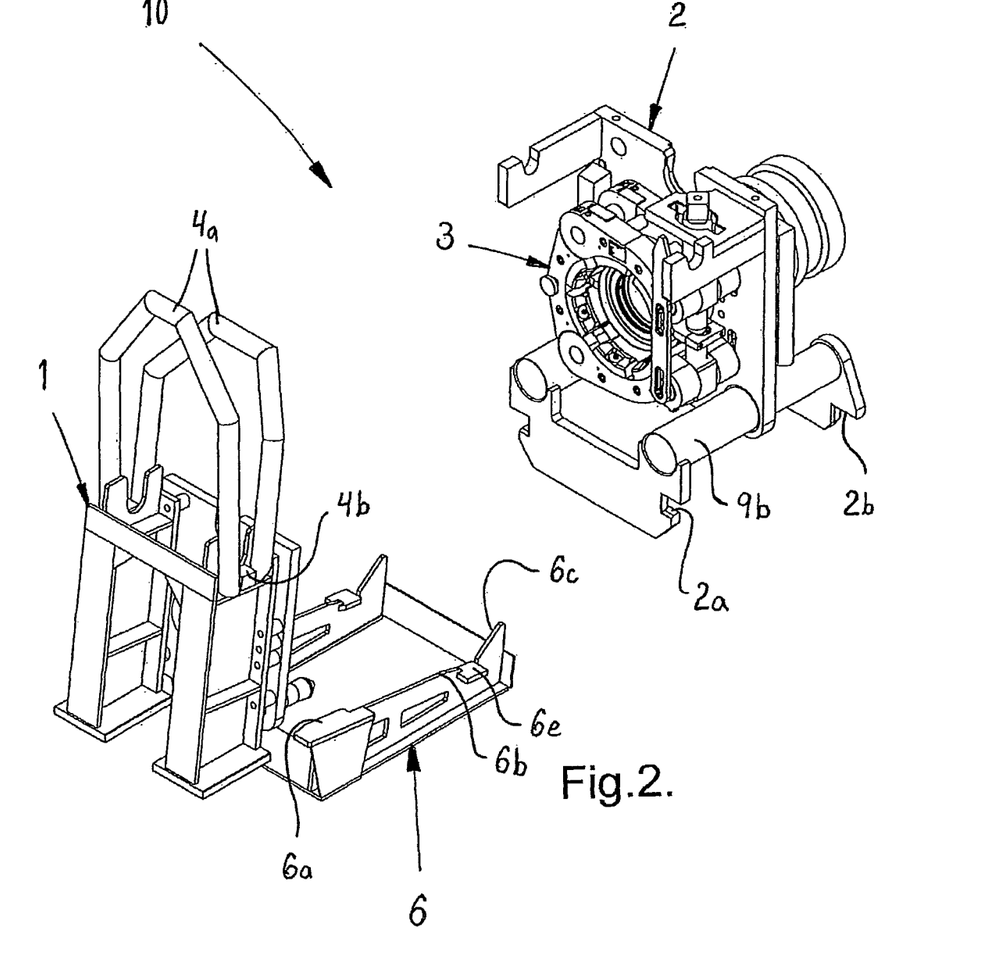
FIG. 2 shows in perspective view the horizontal connecting device according to FIG. 1 from opposite side and with the individual connecting parts spaced apart.
Figures 3, 4, 5:
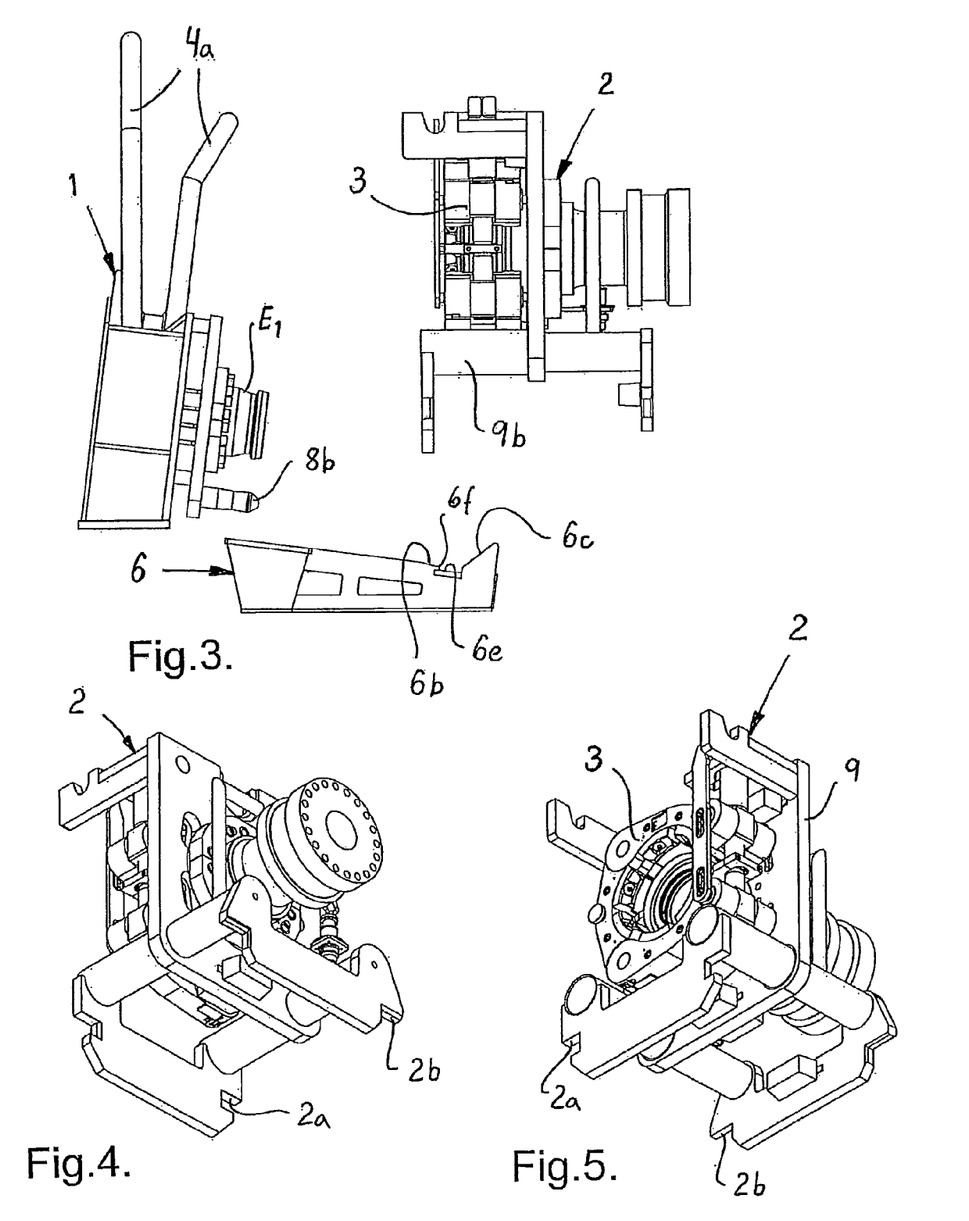
FIG. 3 shows an elevational view of the horizontal connecting device according to FIGS. 1 and 2, still with the individual connecting parts spaced apart.
FIG. 4 shows in perspective view, obliquely from below, the moveable connecting part isolated from the other connecting parts.
FIG. 5 shows in perspective view the moveable connecting part according to FIG. 4 from opposite side.

Reference is now in particular made to FIG. 3 for description of further details of the ramp structure 6 and the first and second connecting part 1, 2, even if the details also are shown in FIGS. 1 and 2. To be precise, the guiding means of the ramp structure 6 are designed and shown as a projecting plate part 6a in the area adjacent to the first connecting part 1, as shown on the figures. Still to be precise, the cooperating means of the second connecting part 2 are designed and shown as an incision 2a, or a notch. Then it is to be understood that the projecting plate part 6a on the ramp structure 6 becomes in slidable engagement with the incision 2a when the pipe ends $E_1$, $E_2$ are moved towards each other in the terminating phase of the mating operation. When they are in complete engagement such prevents any tilting motion of the second connecting part 2 relative to the first connecting part 1.

The abutment, or contact surfaces of the ramp structure 6 can in turn include ramp surfaces as suggested by the reference number 6b. Correspondingly, the second connecting part 2 has contact surfaces 2b that cooperate with the ramp surfaces 6b when the second connecting part 2 is moved towards the first connecting part 1. When the notches 2a are in engagement with the plate parts 6a at the same time as the contact surfaces 2b are lifted by the ramp surfaces 6b during advancement of the second connecting part 2 towards the first connecting part 1, this motion provides fine alignment between the pipe ends $E_1$ and $E_2$.

Further, it is to be noted that at the very rear end of the ramp structure 6, upwardly projecting, inclined surfaces 6c are arranged, which surfaces terminate in a straight edge 6d down to the ramp structure 6. This inclined surface 6c is functioning to guide the second connecting part 2, via the contact surfaces 2b, down to a base surface 6e on the top side of the ramp structure. When the contact surfaces 2b really has arrived at and in contact with the base surfaces 6e, the second connecting part 2 is prevented from unintentional motion rearwards due to the straight stop edge 6d. Also note that at the front end of the base surface 6e a smaller edge 6f is arranged. This edge 6f has the important function to be able to prevent the connecting part 2 from sliding in an uncontrolled way towards the connecting part 1, i.e. without any active mating by means of a pull/push tool (not shown), normally in the form of a linear motor of suitable and per se known type. By means of the stop edges 6d and 6f, the second connecting part 2 rests in peace on the base surfaces 6e due to it own weight.

Further details of the first connecting part 1 consist of a rear plate 7 and a front plate 8. The front plate 8 supports the first pipe end $E_1$. A plurality of braces is arranged between the rear plate 7 and front plate 8 in per se known manner The front plate 8 has at least one adapted mounting 8a in the form of a U-shaped recess which is designed for insertion of the pull/push tool. Moreover, the front plate 8 includes at least one guide pin 8b, here shown two in number, which are located in the lower portion of the front plate 8 and are pointing in a direction towards the second connecting part 2.

Further details of the second connecting part 2 consist of a main plate 9 that supports the second pipe end $E_2$. A plurality of tubular braces are perpendicular located on the main plate 9 and the lower hollow braces 9b simultaneously constitute guiding means in the form of a female part that is to cooperate with the above described guide pin 8b during the finishing part of the mating operation of the connecting parts 1, 2. The main plate 9 also have at least one adapted mount 9a in the form of a U-shaped recess or cut-out, which is designed for insertion of the above described pull/push tool.

Further, a first connecting plate 9c is rigidly connected between the hollow braces 9b in that end facing toward the first connecting part 1, and a second connecting plate 9d is rigidly connected between the hollow braces 9b in that end facing away from the first connecting part 1. The first connecting plate 9c includes the previously described incisions 2a, or notches, that cooperate with the plate edges 6a on the ramp structure 6, i.e. more precisely those plate parts 6a that are facing inwardly of the ramp structure 6.

The second connecting plate 9d includes the previously described contact surfaces 2b that in sequence cooperate firstly with the inclined surfaces 6c, then the base surface 6e and the stop edges 6d and 6f of the ramp structure 6, before the contact surfaces 2b start to ride on the ramp surfaces 6b during last phase of the mating operation.

Described in closer detail, the guide structure 4 consists of an upwardly projecting frame structure 4a in two parts standing like a "Y" relative to each other and that are able to receive a corresponding guide means 5, which is arranged on the second connecting part 2 and is in the form of a removable tool. The guide means 5 of the second connecting part 2 consists of a projecting bail structure 5a which, in an initial phase, in a sliding manner cooperates with the upwards projecting frame structure 4a of the first connecting part 1. When the bail structure 5a is completely introduced and bottoms against a part 4d of the upwardly projecting frame structure 4a, the second connecting part 2 is forced to pivot till abutment against the ramp structure 6. During this phase the pipe ends $E_1$, $E_2$ are coarse aligned relative to each other. The projecting bail structure 5a of the second connecting part 2 can preferably be in the form of a tool that is releasable arranged and can be recovered to the surface after that the connection is made up.

Three options regarding location of the connector 3 itself is contemplated. The connector 3 can be, as shown here, an integrated part of the connecting device 10. In a variant, the connector 3 can be attached to the second connecting part 2 like it is illustrated in the drawings.

As a variant, one may imagine that the connector 3 is attached to the first connecting part 1, where the second connecting part 2 as before is displaceable in a direction toward and away from the first connecting part 1.

As a third variant, one may imagine that the connector 3 constitute a separate unit that can be landed between the pipe ends $E_1$, $E_2$ after that the pipe ends $E_1$, $E_2$ are coarse positioned and aligned relative to each other.

It will also be desirable to introduce that at least one of the connecting parts includes orienting means that are able to turn the second connecting part 2 in the horizontal plane such that the second connecting part 2 is allowed to coarse align relative to the first connecting part 1, such that the pipe ends $E_1$, $E_2$ are brought substantially in line before final lowering of the second connecting part 2 against the first connecting part 1.

FIGS. 4 and 5 only show other perspective views of the second connecting part so that the entire object is shown.

Figure 6A:
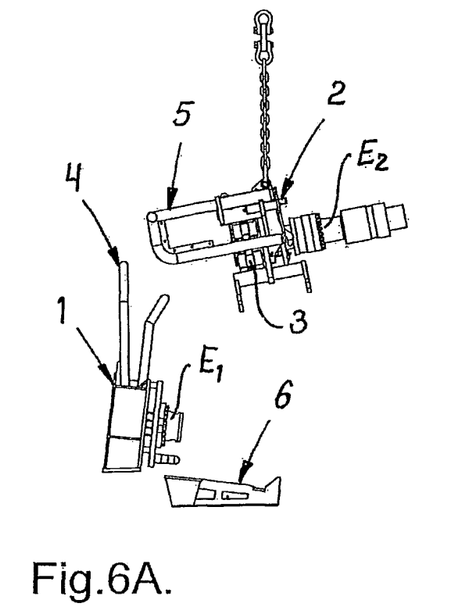
FIG. 6A-6H show sequences of a connecting operation.

FIG. 6A to 6H show sequences of the mating operation that takes place between the connecting parts 1, 2 and by use of the ramp structure 6 as assisting means. FIG. 6A shows that the second connecting part 2 is lowered by means of an installation tool 5, 5a from the surface, for example from a surface vessel. The second connecting part 2 is designed to land on the ramp structure 6 as described above.

Figure 6B:
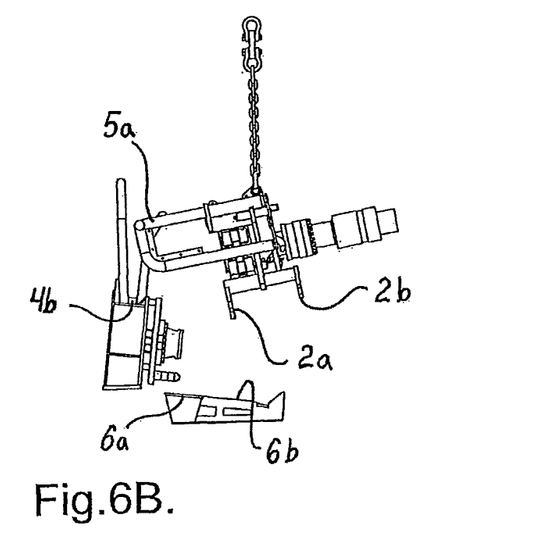

FIG. 6B shows that moment when the second connecting part 2 hits the first connecting part 1, in that the bail structure 5a hits the Y-configured, upwardly facing mouth of the frame structure 4a.

Figure 6C:
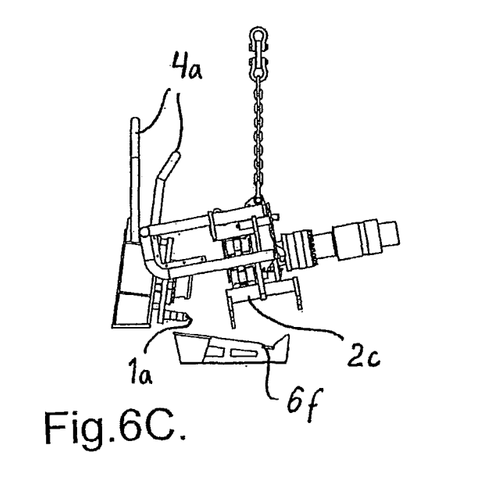

FIG. 6C shows that moment when the bail structure 5a bottoms in the frame structure 4a and starts to pivot towards the ramp structure 6 about a pivot point which is exactly located in the bottom of the frame structure 4a.

Figure 6D:
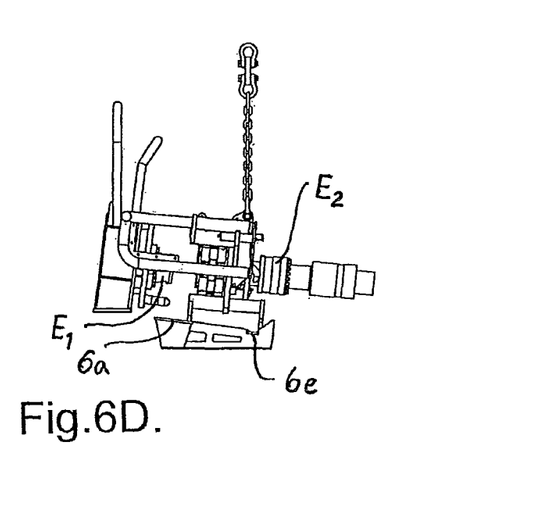

FIG. 6D shows that moment when the second connecting part 2 is landing on the ramp structure 6 and is guided in by means of the inclined surfaces 6c. This is also that situation when the incisions 2a are guided in and over the plate parts 6a in order to make engagement with each other.

Figure 6E:
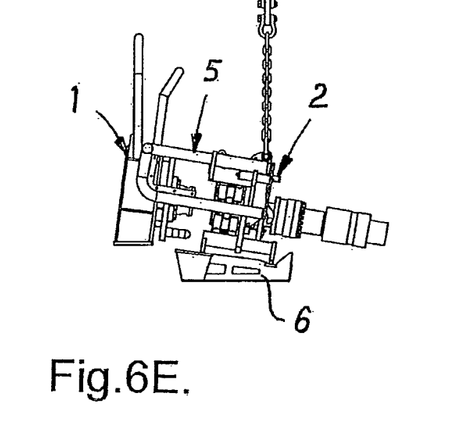

FIG. 6E shows first intermediate position before final connection is made. Now the contact surfaces 2b stand resting against the base surfaces 6e and are prevented by the stop edge 6d from rearward movement. The notches 2a are advanced to engagement with the plate parts 6a and prevent tilting motion as previously described.

Figure 6F:
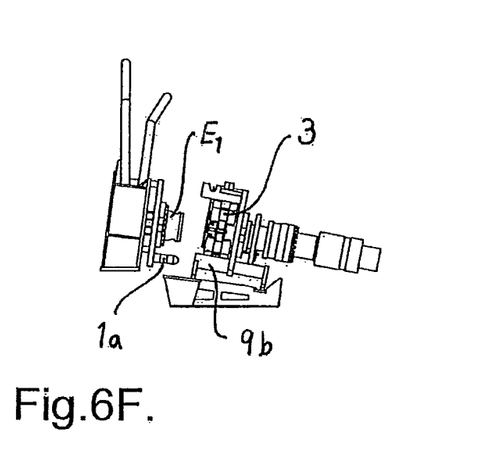

FIG. 6F shows the same situation for the connecting device 10 as FIG. 6E, but the installation tool 5, 5a is removed and recovered to the surface for later use. When the tool is removed, it is the edge 6f that prevents forward motion.

Figure 6G:
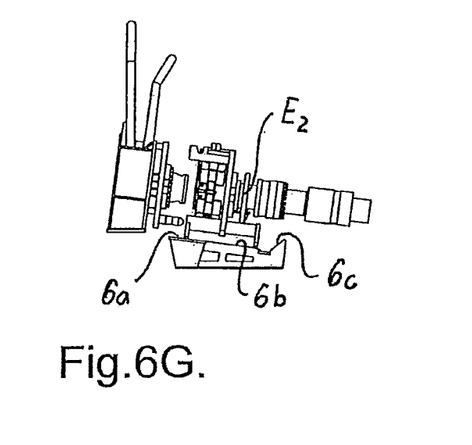

FIG. 6G shows the situation that the second connecting part 2 has been pulled toward the first connecting part 1 by means of the pull/push tool (not shown). The contact surfaces 2b has started to climb onto the ramp surfaces 6b and tilt the second pipe end $E_2$ upwards.

Figure 6H:
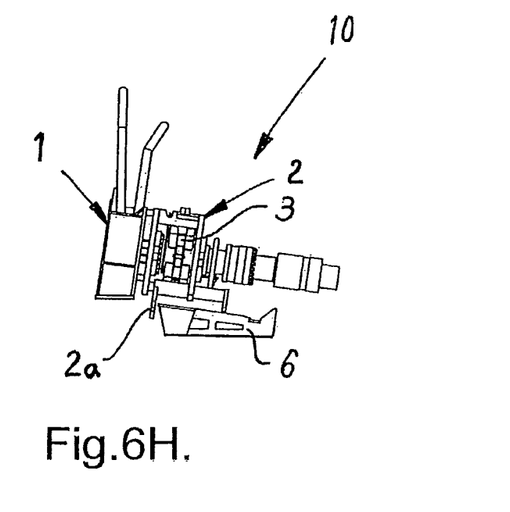

FIG. 6H shows the situation when the second connecting part 2 is completely mated with the first connecting part 1 and ready for actuation of the clamp connector 3 for final connection. The notches 2a have passed beyond the plate parts 6a and now remain in the free and are disengaged. After that final connection is made, also the contact surfaces 2b are lifted from the ramp surfaces 6b. Thus the entire second connecting part 2 is free from the ramp structure 6.

It is further to be understood that the above described solution is functioning as well on flexible pipeline as umbilical. The entire connecting operation is functioning in the same way, but with more pipes in the pipe end $E_2$, in addition to a connecting box (terminal) behind the end $E_2$ having electric/optical connectors.

The invention claimed is:

1. A connecting device for mating and connection on the sea bed of a first and second pipeline having respective first and second pipe ends at the connection point, comprising:
    a first connecting part retaining the first end of the first pipeline, which first connecting part and first pipeline are designed to be lowered and deployed on the seabed in advance, and where the first connecting part includes a guide structure located a distance apart from the first end;
    a second submersible connecting part retaining the second end of the second pipeline, which second connecting part and second pipeline are designed to be lowered from the surface towards the first connecting part, and where the second connecting part includes a guide device located a distance apart from the second end; and
    a connector arranged between the connecting parts for final connection between the pipe ends,
    wherein the guide device cooperates with the guide structure during lowering motion of the second connecting part and pivots the second connecting part into coarse alignment of the second pipe end in a direction towards the first pipe end such that the first and second pipelines are brought to align with each other on the sea bed,
    wherein the first connecting part includes an adjacent ramp structure having abutment surfaces and a guiding mechanism configured to engage with cooperating surfaces and a structure on the second connecting part when the second connecting part is advanced towards the first connecting part to provide fine alignment of the pipe ends, and
    wherein the abutment surfaces of the ramp structure include ramp shaped surfaces that the cooperating surfaces of the second connecting part act against, and then provides fine alignment between the pipe ends when the second connecting part is advanced towards the first connecting part.

2. The connecting device according to claim 1, wherein the adjacent ramp structure is physically separated from the first connecting part such that the second connecting part can be parked on the ramp structure subsequent to a disconnecting operation between the connecting parts, wherein the structure that the first connecting part is a part of can be retrieved to the surface as required, while the other connecting parts remain parked in respective ramp structures on the seabed.

3. The connecting device according to claim 1, wherein the guide structure is an upwardly projecting frame structure which is able to receive the corresponding guide device arranged on the second connecting part.

4. The connecting device according to claim 3, wherein the guide device of the second connecting part includes a projecting bail structure that, in an initial phase, in a sliding manner, cooperates with the upwardly projecting frame structure of the first connecting part, and when the bail structure is completely introduced into and bottoms out against a portion of the upwardly projecting frame structure, the second connecting part pivots until abutment with the ramp structure, said pipe ends then are coarsely aligned relative to each other.

5. The connecting device according to claim 1, wherein the first connecting part includes at least one guide pin and the second connecting part correspondingly includes at least a cooperating female part which together constitutes a further guiding mechanism.

6. The connecting device according to claim 1, wherein the connector constitutes an integrated part of the connecting device, where the connector is secured onto the second connecting part and the second connecting part is displaceable in a direction towards and away from the first connecting part, where the pipe ends thus are positioned before final connection of the pipe ends by said connector.

7. The connecting device according to claim 1, wherein the connector constitutes an integrated part of the connecting device, where the connector is secured onto the first connecting part and the second connecting part is displaceable in a direction towards and away from the first connecting part, where the pipe ends thus are positioned before final connection of the pipe ends by said connector.

8. The connecting device according to claim 1, wherein the connector constitutes a separate unit that can be landed between the pipe ends subsequent to that the pipe ends are coarsely positioned and aligned relative to each other.

9. The connecting device according to claim 1, wherein the connector is of the type "clamp connector" having internally arranged, annular and inclined surfaces which by activation forces two pipe flanges axially towards each other, where one of the flanges has a sealing ring arranged thereon having externally arranged, annular and inclined surfaces or the connector is of the type "collet connector".

10. The connecting device according to claim 1, wherein at least one of the connecting parts include an orienting that is able to turn the other connecting part in the horizontal plane in order to coarsely align the second connecting part relative to the first connecting part, such that the pipe ends, in this way, are brought substantially in line with each other before further lowering of the second connecting part along the guide structure.

11. The connecting device according to claim 4, wherein the projecting bail structure of the second connecting part is in the form of a tool which is releasable arranged and can be recovered to the surface after the connection is made up.

12. The connecting device according to claim 1, wherein the first and second connecting part include at least one adapted mount for insertion of a pull/push tool.

13. A connecting device for mating and connection on the sea bed of a first and second pipeline having respective first and second pipe ends at the connection point, comprising:
a first connecting part retaining the first end of the first pipeline, which first connecting part and first pipeline are designed to be lowered and deployed on the seabed in advance, and where the first connecting part includes a guide structure located a distance apart from the first end;
a second submersible connecting part retaining the second end of the second pipeline, which second connecting part and second pipeline are designed to be lowered from the surface towards the first connecting part, and where the second connecting part includes a guide device located a distance apart from the second end; and
a connector arranged between the connecting parts for final connection between the pipe ends,
wherein the guide device cooperates with the guide structure during lowering motion of the second connecting part and pivots the second connecting part into coarse alignment of the second pipe end in a direction towards the first pipe end such that the first and second pipelines are brought to align with each other on the sea bed,
wherein the first connecting part includes an adjacent ramp structure having abutment surfaces and a guiding mechanism configured to engage with cooperating surfaces and a structure on the second connecting part when the second connecting part is advanced towards the first connecting part to provide fine alignment of the pipe ends, and
wherein the guiding mechanism of the ramp structure includes a projecting plate part, and the cooperating structure of the second connecting part include an incision, where the projecting plate part and said incision come into engagement with each other when the pipe ends approach each other and then prevent possible tilting motion of the second connecting part.

14. The connecting device according to claim 13, wherein the abutment surfaces of the ramp structure include ramp shaped surfaces that the cooperating surfaces of the second connecting part act against, and then provides fine alignment between the pipe ends when the second connecting part is advanced towards the first connecting part.

15. A connecting device for mating and connection on the sea bed of a first and second pipeline having respective first and second pipe ends at the connection point, comprising:
a first connecting part retaining the first end of the first pipeline, which first connecting part and first pipeline are designed to be lowered and deployed on the seabed in advance, and where the first connecting part includes a guide structure located a distance apart from the first end;
a second submersible connecting part retaining the second end of the second pipeline, which second connecting part and second pipeline are designed to be lowered from the surface towards the first connecting part, and where the second connecting part includes a guide device located a distance apart from the second end; and
a connector arranged between the connecting parts for final connection between the pipe ends,
wherein the guide device cooperates with the guide structure during lowering motion of the second connectin art and pivots the second connecting art into coarse alignment of the second pipe end in a direction towards the first pipe end such that the first and second pipelines are brought to align with each other on the sea bed,
wherein the first connecting part includes an adjacent ramp structure having abutment surfaces and a guiding mechanism configured to engage with cooperating surfaces and a structure on the second connecting part when the second connecting part is advanced towards the first connecting part to provide fine alignment of the pipe ends,
wherein the adjacent ramp structure is physically separated from the first connecting part such that the second connecting part can be parked on the ramp structure subsequent to a disconnecting operation between the connecting parts, wherein the structure that the first connecting part is a part of can be retrieved to the surface as required, while the other connecting parts remain parked in respective ramp structures on the seabed, and
wherein the guiding mechanism of the ramp structure includes a projecting plate part, and the cooperating structure of the second connecting part include an incision, where the projecting plate part and said incision come into engagement with each other when the pipe ends approach each other and then prevent possible tilting motion of the second connecting part.

* * * * *